Dec. 25, 1951  H. F. MINTER ET AL  2,579,596
PROCESS FOR POLYMERIZING LARGE BODIES OF RESINS
Filed July 14, 1948
Fig. 1.
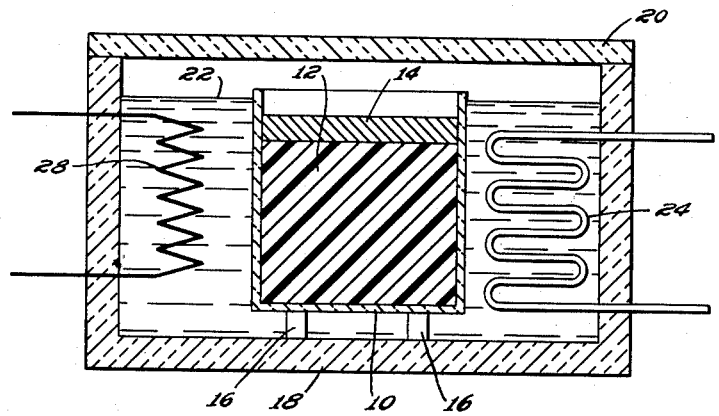
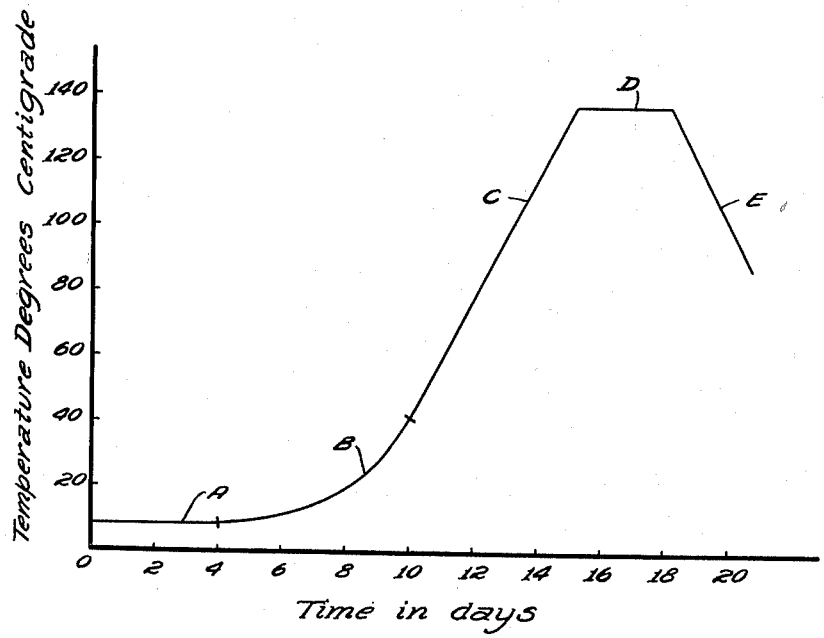
Fig. 2.
WITNESSES:
Robert A. Baird
Robert E. Ross
INVENTORS
Herbert F. Minter and
Milton M. Leven.
BY
Frederick Shapoe
ATTORNEY Patented Dec. 25, 1951

2,579,596

UNITED STATES PATENT OFFICE 2,579,596

PROCESS FOR POLYMERIZING LARGE BODIES OF RESINS

Herbert F. Minter and Milton M. Leven, Pittsburgh, Pa., assignors to Westinghouse Electric Corporation, East Pittsburgh, Pa., a corporation of Pennsylvania Application July 14, 1948, Serial No. 38,604

4 Claims. (Cl. 260—45.4)

This invention relates to a process for casting and polymerizing large bodies of resin which are suitable for photoelastic studies.

The preparation of resin bodies for such purpose imposes the most severe requirements as to homogeneity and optical properties, since the bodies must be free from cracks, voids and residual stresses. They must also be transparent to polarized light and must possess the property of showing fringes in direct proportion to the induced stresses when exposed to polarized light.

Inasmuch as the accuracy of the results of photoelastic studies are proportional to the size of the resin body used for study, it is desirable to use the largest resin body obtainable, particularly in three dimensional "frozen stress" photoelastic studies. In such studies, a resin model is subjected to stresses while at an elevated temperature and cooled, while so loaded, to room temperature. The model retains the imposed deformations when unloaded at room temperature and it can then be sliced into thin sections and studied under polarized light to determine the distribution of stresses therein.

In copending applications Serial Nos. 789,748 and 789,749, both filed December 4, 1947 and assigned to the same assignee as the present application, there are described particular resins and a process of casting and polymerizing such resins to make larger bodies for photoelastic studies than had been previously possible.

In the process disclosed in the above-identified application and described hereinafter, a large mass of resin of a suitable composition is subjected to a critical heating and cooling cycle, to cause polymerization of the resin into a solid body. In practicing this process, it has been found essential to exclude air and moisture from the mass of resin during polymerization to prevent clouding and cracking of the resin body. To accomplish the exclusion of air and moisture it has been regarded as necessary to polymerize the resin in a sealed convex cylindrical glass container of suitable size. The manufacture of such sealed containers is expensive and difficult particularly in cases where it is desired that the solid resin body have a shape other than cylindrical.

Even in cases where the mold is a cylinder and can be more or less readily sealed, it is usually necessary to destroy the glass mold to remove the casting therefrom. Often portions of the surface of the polymerized casting adhere to the glass mold. Inasmuch as a sealed glass mold for a cylindrical casting six inches in diameter and thirty inches in length costs approximately $100, it would be desirable to utilize molds for casting which could be reused.

The object of this invention is to provide a process for polymerizing in the open thermosetting liquid compositions into large isotropic homogeneous bodies of resin by covering the surface of liquid to be polymerized with a protective layer of a liquid sealing material.

A further object of the invention is to provide a process and apparatus for polymerizing thermosetting liquid compositions in an open mold into large resin bodies suitable for photoelastic studies freely removable from the mold by covering the liquid composition with a layer of liquid 1,5-pentanediol whereby the mold may be reused.

Other objects of the invention will, in part, be obvious and will, in part, appear hereinafter.

For a better understanding of the nature and objects of the invention, reference should be had to the following detailed description, taken in conjunction with the accompanying drawing, in which:

Figure 1 is a vertical cross section through an apparatus for polymerizing resins in accordance with the invention; and Fig. 2 is a graph plotting temperature against time for a typical polymerization cycle.

In particular, this invention relates to the polymerization of compositions embodying unsaturated alkyd resins dissolved in polymerizable liquid monomers having the group $H_2C=C<$. Suitable alkyd resins or polyesters preferred for the practice of this invention are those disclosed more fully in the copending applications above-identified. Briefly, the alkyd resins are prepared by reacting a glycol, such as diethylene glycol, with a mixture of saturated and unsaturated dicarboxylic organic acids, the diethylene glycol being slightly in excess of the dicarboxylic acids but not exceeding 10 mole percent more. The unsaturated dicarboxylic acids are composed of either maleic acid or fumaric acids or mixtures of both, and the saturated dicarboxylic acids are either sebacic acid or adipic acid, or mixtures of both saturated acids, in an amount equal to from 25 to 30 mole percent of the total acids.

A particularly desirable alkyd resin for photoelastic studies was composed of the reaction product of 23.3 moles of diethylene glycol, 7.125 moles of sebacic acid, and 15.9 moles of maleic acid. The alkyd resin so produced is dissolved in a polymerizable liquid monomer having the group $H_2C=C<$. Particularly good results having been obtained by employing monostyrene as the solvent for the alkyd resin. The monostyrene has been employed in the proportions of from 34% to 74% of the total solution. The mixture should be thoroughly mixed to secure a homogeneous solution.

The present process may be applied to other polymerizable compositions, with or without polymerization catalysts, than those disclosed in our copending applications, since the process will produce large, sound blocks of resin free from cracks and flaws, suitable for many other applications. For example, the process may be applied to polymerize solutions of any alkyd resin having unsaturated groups capable of vinyl polymerization dissolved in copolymerizable liquid monomers having the group $H_2C=C<$. Examples of the liquid monomers are monostyrene, vinyl acetate, vinyl chloride, allyl alcohol, ethyl acrylate, methyl vinyl ketone, diallyl phthalate, methyl methacrylate and acrylonitrile. Examples of unsaturated alkyd resins suitable for copolymerization with the monomers having the group $H_2C=C<$ are castor oil maleates, propylene glycol fumarate and ethylene glycol maleate.

In polymerizing any of the liquid compositions, in accordance with the present invention, they are admixed, while at room temperature or lower, preferably 20° C. or below, with from about 0.1% to about 2% of their weight of a soluble polymerization catalyst. The amount of catalyst may be varied to suit requirements. Peroxides are particularly good catalysts for this purpose. Excellent results have been obtained by using 1% of tertiary butyl perbenzoate. Benzoyl peroxide, ascaridole, di-t-butyl peroxide, and other catalysts for causing vinyl type polymerization of the liquid compositions may be employed individually or as mixtures of two or more. The catalyst should dissolve in the composition in order to secure a uniform distribution therein. The composition with the dissolved catalyst is filtered to remove any possible undissolved matter and kept at a low temperature of about 0° C. until polymerization thereof is initiated.

It is critical that the walls of the container in which the composition is to be polymerized be composed of a material inert to the composition. We have found glass to be particularly suitable. Containers of polyethylene or of polytetrafluoroethylene may also be used. It has been found that to insure the production of resin bodies suitable for photoelastic study, air and moisture must be excluded from the resin composition during the polymerization cycle.

In accordance with the present invention, it has been found that the liquid composition may be polymerized in an open mold if it is covered with a layer of 1,5-pentanediol during polymerization, whereby air and moisture is effectively prevented from contacting the polymerizable liquid composition and the resulting polymerized resin body will not stick to the walls of the mold after polymerization.

Referring now to Fig. 1, there is illustrated an apparatus for conducting the polymerization in accordance with this invention. An open container 10, of glass, for example, is filled with the polymerizable liquid composition 12. Any type of open-ended container may be used, including non-cylindrical pans or forms. A layer 14 of 1,5-pentanediol is disposed over the polymerizable liquid 12 to prevent the entry of air or moisture. The depth of the layer 14 is not critical. A layer of about 1½ inches has been found satisfactory. The container 10 with its contents 12 rests on supports 16 inside an insulated cabinet 18. An insulating cover 20 on the cabinet isolates the interior from exterior light and heat. The interior of the cabinet 18 is filled with a liquid 22 such as water, oil or the like capable of equalizing the temperatures around the container 10 and maintaining a constant predetermined temperature. A cooling coil 24 is disposed within the cabinet 18 in order to cool the fluid 22 and the container 10 with its contents to a predetermined temperature. The fluid 22 is also in contact with a heating element 26 disposed within the cabinet 18 to supply heat to the fluid 22 during certain portions of the polymerization cycle.

In operation, the composition 12 within container 10 is cooled rapidly after the catalyst has been dissolved to a predetermined low temperature depending on the relative diameter of the container 10 and kept at such temperature for four days. It has been found that the diameter of the body of the composition 12 or the least major dimension thereof, is a critical factor to consider in the polymerization of the body of the composition. Since the internal diameter or least major dimension from one point to a directly opposite point of the glass container determines the dimensions of the body of the composition, they will be both referred to as equivalent. The temperature of the body of the composition must be maintained within the limits of 5° C. to 18° C. at the start of polymerization. The temperature within this range is related to the interior diameter of the glass container 10 by the empirical equation.

$$T°C = 50/D$$

where D is the internal diameter in inches of the glass container and D has a value of from 10 inches to 3 inches. It is assumed that the height of the body of composition is at least as great as the diameter. For containers of non-circular cross-section, D is the least major internal dimension. Containers of a diameter of 10 inches and greater should be maintained at 5° C. while containers of less than 3 inches in diameter are maintained at a temperature not exceeding 18° C. The temperatures are quite critical and a departure of more than one or two degrees centigrade from these values has either resulted in unsatisfactory bodies for photoelastic studies or else the reaction fails to proceed.

After being maintained for 4 days at the indicated low temperatures, it will be found that the composition 12 has partially gelled and become viscous, but is still fluid. The partially gelled composition may be maintained for some time at this temperature or even at a lower temperature, but this prolongs the reaction without any added benefits. Thereafter, the temperature is raised slowly at a gradually increasing rate so that a temperature of approximately 40° C. is reached in approximately the same number of days as the number of inches of internal diameter of the container 10. The rate of heating may be conducted slower than this rate, but this only prolongs the reaction. At this time, if desired, the water or oil 22 may be removed and the container 10 may be heated while surrounded with air or other gas.

Further polymerization is carried out at higher temperatures. Referring to Fig. 2, there is illustrated a curve correlating the temperatures and times in days required for carrying out the entire polymerization of the compositions for a container having an internal diameter of 6 inches. The curve has five distinct parts designated as A—the initial low temperature dwell period;
B—temperature rise at an increasing rate;
C—a uniform rate of temperature increase;
D—a high temperature dwell period; and
E—a uniform slow cooling to room temperature.

It will be noted that in part A of the curve, the temperature is maintained at 9° C. for about 4 days, then in part B the temperature is gradually increased so that between the 9th and 10th day, it has reached a temperature of 40° C. The rate of temperature rise is maintained constant from 40° C. until a temperature of from 110° C. to 160° C. has been reached. Short times with adequate control are most readily secured in the range from 120° C. to 150° C. and for this reason this range may be preferable. The rate at which the temperature increases should not be in excess of ¾° C. per hour for glass containers of 10 inches diameter and greater, preferably at about ½° C. per hour. The rate of temperature rise may be increased in inverse proportion to the diameter of the glass container to a maximum of 2° C. per hour for glass containers of 3 inches internal diameter and less. As shown in Fig. 2, the temperatures at part D were permitted to rise to approximately 135° C. and were maintained at this selected temperature for approximately 3 days. At these elevated temperatures the resin is fully cured into a hard body that is homogeneous and isotropic. The composition 12 is held at the maximum temperature at part D for a period of time inversely proportional to the temperatures. Thus at 150° C. 1 day is suggested, while at 120° C., 4 days is required. While the maximum temperatures need not be held constant but may be varied, the operating difficulties involved render it preferable not to change the maximum temperatures.

After having been polymerized at the elevated temperature, the resin solid produced within the container 10 will be found to have shrunk substantially. During shrinkage, the 1,5-pentanediol flows into the voids between the walls and the resin body providing better heat transfer therebetween and assisting in preventing the sticking of the resin body to the walls of the container. It has been found that the use of 1,5-pentanediol as hereinbefore described completely eliminates sticking of the resin body to the walls. The reason for the elimination of sticking has not been definitely determined, and it has not been attained with other liquids. After completion of the polymerization cycle, the solid resin body may be easily removed from the mold.

The process of this invention involving the use of 1,5-pentanediol as a surface protective liquid layer on polymerizable compositions eliminates the need for expensive sealed containers which can only be used once thereby making the polymerization of large bodies of resin much more convenient and economical than it has been heretofore. After cleaning, the container, it may be re-used over and over again.

Since certain obvious changes may be made in the above procedures and different embodiments of the invention could be made without departing from the scope thereof, it is intended that all matter contained in the above description and taken in connection with the accompanying drawing, shall be interpreted as illustrative and not in a limiting sense.

We claim as our invention:

1. In the process of polymerizing a relatively large body of a completely polymerizable liquid composition composed of a solution of an unsaturated polyester of at least one dicarboxylic acid and a liquid polymerizable monomer having the group $H_2C=C<$, into a homogeneous solid, the steps comprising dissolving a peroxide catalyst in the composition, the peroxide catalyst being the only catalyst for the reaction, placing the catalyzed composition in an open container of an inert, non-reactive material, the container being of circular cross-section, covering the composition in the container with a layer of 1,5-pentanediol to seal the composition against the entry of atmospheric gases and moisture, reducing the temperature of the composition to between 5° C. and 18° C. in the absence of photocatalytic light, the temperature being related to the internal diameter of the container by the empirical equation $$T°C = 50/D$$

where D is the internal diameter in inches of the container, D having a value of from 10 inches to 3 inches, containers of a diameter of 10 inches and greater being maintained at 5° C. and containers less than 3 inches in diameter being maintained at a temperature not exceeding 18° C., the containers being maintained at the temperatures indicated for at least 4 days, then the temperature being slowly raised at a gradually increasing rate so that a temperature of 40° C. is reached in not less than approximately the same number of days as the number of inches of internal diameter of the container, this time being not less than two days in any event, then raising the temperature at a rate of not in excess of ¾° C. per hour for glass containers of a diameter of 10 inches and over and not in excess of 2° C. per hour for containers of 3 inches internal diameter and less, the maximum rate of temperature rise being proportioned between these limits inversely to the diameter for containers between 3 inches and 10 inches internal diameter, to an elevated temperature of from 120° to 150° C. and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid, the 1,5-pentanediol serving to prevent the resin solid from adhering to the container.

2. In the process of polymerizing a relatively large body of a completely polymerizable liquid composition composed of a solution of a diethylene glycol-maleic acid-sebacic acid resin and monostyrene into a homogeneous solid, the steps comprising dissolving a peroxide catalyst in the composition in an amount of from 0.1% to 2% of the weight of the composition, the peroxide catalyst being the only catalyst for the reaction, placing the catalyzed composition in an open glass container of circular cross-section, covering the composition in the container with a layer of 1,5-pentanediol to seal the composition against the entry of atmospheric gases and moisture, reducing the temperature of the composition to between 5° C. and 18° C. in the absence of photocatalytic light, the temperature being related to the internal diameter of the glass container by the empirical equation $$T°C = 50/D$$

where D is the internal diameter in inches of the glass container, D having a value of from 10 inches to 3 inches, containers of a diameter of 10 inches and greater being maintained at 5° C. and containers less than 3 inches in diameter being maintained at a temperature not exceeding 18° C., the containers being maintained at the temperatures indicated for at least 4 days, then the temperature being slowly raised at a gradually increasing rate so that a temperature of 40° C. is reached in not less than approximately the same number of days as the number of inches of internal diameter of the glass container, this time being not less than two days in any event, then raising the temperature at a rate of not in excess of ¾° C. per hour for glass containers of a diameter of 10 inches and over and not in excess of 2° C. per hour for containers of 3 inches internal diameter and less, the maximum rate of temperature rise being proportioned between these limits inversely to the diameter for containers between 3 inches and 10 inches internal diameter, to an elevated temperature of from 120° to 150° C. and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid, the 1,5-pentanediol serving to prevent the resin from adhering to the container.

3. In the process of polymerizing by heating a liquid, completely reactive composition comprising a solution of an unsaturated polyester of at least one dicarboxylic acid and a liquid monomer having the group $H_2C=C<$ and capable of being converted into a solid body by heating, the quality of the resulting solid body being affected detrimentally by exposure of the liquid composition to the atmosphere during polymerization, the steps comprising introducing the composition into an open vessel, applying a surface layer of 1,5-pentanediol to seal off the composition from the atmosphere and heating the vessel to cause the composition to polymerize to a solid.

4. The process of claim 3, wherein the surface layer of 1,5-pentanediol is of a thickness of the order of 1.5 inches.

HERBERT F. MINTER.
MILTON M. LEVEN.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,467,527 | Harris | Apr. 19, 1949 |

OTHER REFERENCES

Rust: Ind. and Eng. Chem., pp. 64–67, January 1940.

Modern Plastics, pp. 111, 114 and 115, October 1947.

Weeks: Plastics (of London) pp. 588–592, November 1947.

R. Harry: British J. Dermatol. Syphilis, 54, 1–22 (1942), abstracted in Chem. Abstracts 1943, page 5198.